United States Patent Office 2,843,492
Patented July 15, 1958

2,843,492

ANIMAL FEED MATERIAL

Roger Bart and William B. Williams, Lakeland, Fla., assignors to International Minerals & Chemical Corporation, a corporation of New York No Drawing. Application November 25, 1955
Serial No. 549,185

13 Claims. (Cl. 99—6)

This invention relates to an animal feed material. More particularly, the invention embraces an enriched, liquid, animal feed material consisting essentially of molasses and a particulate calcium phosphate.

Molasses has long been recognized as a valuable animal feed which, by reason of its normal existence in the liquid state, offers advantages in transportation and distribution which are not enjoyed by solid animal feeds. However, molasses alone is an inadequate animal ration. Various expedients for enriching molasses have, accordingly, developed in the art. These expedients generally have resulted in a solid, non-flowable product which sacrifices the advantages which attend the normally liquid state of molasses and which frequently are sticky masses which are difficult to package, ship, and distribute.

It is, accordingly, a primary object of the invention to provide a physically stable, liquid, enriched molasses animal feed material.

It is a further object of the invention to provide a physically stable, liquid, animal feed material in the form of molasses enriched with a particulate calcium phosphate.

It is an additional object of the invention to provide a mixture of molasses and a particulate calcium phosphate which does not separate in storage.

It is a more specific object of the invention to provide an enriched physically stable, animal feed material which is flowable or pumpable at temperatures in excess of 32° F. and which comprises particulate calcium phosphate uniformly dispersed in molasses.

The invention generally embraces an enriched, physically stable, animal feed material, said material being flowable at temperatures in excess of 32° F. and consisting essentially of molasses having substantially uniformly dispersed therein a particulate calcium phosphate having a particle size not greater than 325 mesh, said calcium phosphate being present in said feed material in an amount not greater than about 20% of the weight of said molasses.

All types of molasses which are suitable for use as animal food are contemplated by the invention. For example, citrus molassas, cane molasses, and beet molasses of all types can be utilized. Blackstrap molasses, which is the uncrystallizable residual resulting from the manufacture of beet and cane sugar, is preferred. Such molasses can be employed either as it is obtained from the manufacturing plant in which it is produced, or diluted with water, or the like.

Similarly, all animal feed grade calcium phosphates can be employed. Representative phosphates include tricalcium, dicalcium, and monocalcium orthophosphate. Preferably, feed grade dicalcium phosphate or feed grade monocalcium phosphate is employed. It is essential to the production of the liquid, physically stable, animal feed materials of this invention that the particle size of the calcium phosphate utilized be not greater than about 325 mesh. Preferably, the calcium phosphate employed in the compositions of this invention is characterized by a mesh size of about 325 mesh to about 500 mesh.

It is additionally essential that the calcium phosphate embodied in the animal feed compositions of the invention be utilized in an amount by weight equal to not more than about 20% of the weight of the molasses present. Preferably, the calcium phosphates are employed in an amount by weight equal to from about 2% to about 5% of the weight of the molasses.

The animal feed compositions of this invention are appropriately prepared by mechanically mixing a particulate calcium phosphate with the molasses under conditions requisite to effect a substantially uniform dispersion of the calcium phosphate throughout the molasses. Apparatus suitable for such mixing includes recirculating pump, portable motor-driven agitator, fixed shaft agitator, etc.

The molasses and calcium phosphate can be mixed at prevailing atmospheric temperatures. If desired, the viscosity of the molasses can be reduced as by heating, or the like, to facilitate dispersion of the calcium phosphate therein.

The invention is illustrated in the following examples which represent the best modes presently known for the practice thereof.

Example I

Approximately 100 parts by weight of blackstrap molasses obtained from a sugar cane refinery are placed in a shaft mixer, together with two parts by weight of animal feed grade dicalcium phosphate having a particle size of less than 325 mesh. The mixer was started and operated for a time period requisite to effect substantially uniform dispersion of the dicalcium phosphate throughout the molasses and produces a flowable, physically stable, animal feed material consisting essentially of molasses and dicalcium phosphate. The composition is stable against separation of ingredients on storage under atmospheric conditions of temperature for at least four days, and is flowable at all temperatures in excess of 32° F. By way of comparison, a repetition of the foregoing example with the exception that a dicalcium phosphate having a particle size of —100 +200 is employed. The composition so produced is not physically stable and the dicalcium phosphate separated from the composition so produced on standing under atmospheric conditions of temperature after about 24 hours.

Similarly, by way of comparison, repetition of the example but utilization of dicalcium phosphate in an amount equal to about 100% by weight of said molasses resulted in a non-flowable composition, under normal atmospheric temperatures of 20° F. to 100° F.

Example II

Example I is repeated with the exception that in this instance a feed grade monocalcium phosphate is employed having a particle size of about 325 mesh. There is produced an animal feed material which is physically stable and which is liquid and pumpable at temperatures in excess of 32° F.

Example III

Example I is repeated with the exception that in this instance citrus molasses is used in lieu of blackstrap molasses with like results.

Example IV 100 parts by weight of blackstrap molasses obtained from a beet sugar refinery are blended with 2 parts by weight of tricalcium orthophosphate in the manner described in Example I. The product so produced is flowable and liquid at all temperatures in excess of 32° F.

and does not segregate into its component parts on standing for about four days.

The animal feed materials of this invention combine the nutritional benefits of both calcium phosphates and molasses with the advantages in transportation and distribution which attend unenriched molasses. The invention provides an enriched molasses animal feed material which can be distributed, for example, by gravity from a storage tank to a feeding trough. The feed materials of the invention can be utilized in the same way as unenriched molasses. When combined with other portions of the animal diet, the feed materials afford an appetizing and palatable ration.

We claim:

1. An enriched, physically stable, animal feed material, said material being liquid and flowable at temperatures in excess of 32° F. and consisting essentially of liquid molasses having substantially uniformly dispersed therein a solid, particulate calcium phosphate having a particle size not greater than 325 mesh, said calcium phosphate being present in said feed material in an amount by weight between about 2% and about 20% of the weight of said molasses, said molasses and said particulate calcium phosphate being the sole essential ingredients in said product, said particulate calcium phosphate being the only phosphatic material present in said product, and the only water present in said product being that contained in said molasses.

2. The animal feed material of claim 1 in which the particle size of said calcium phosphate is from about 325 mesh to about 500 mesh.

3. The animal feed material of claim 1 in which the calcium phosphate is dicalcium phosphate.

4. The animal feed material of claim 3 in which the molasses is citrus molasses.

5. The animal feed material of claim 3 in which the molasses is sugar cane molasses.

6. The animal feed material of claim 1 in which the calcium phosphate is monocalcium phosphate.

7. The animal feed material of claim 6 in which the molasses is citrus molasses.

8. The animal feed material of claim 6 in which the molasses is sugar cane molasses.

9. The animal feed material of claim 1 in which the calcium phosphate is tricalcium orthophosphate.

10. The animal feed material of claim 9 in which the molasses is citrus molasses.

11. The animal feed material of claim 9 in which the molasses is cane molasses.

12. The animal feed material of claim 9 in which the molasses is beet molasses.

13. The animal feed material of claim 12 in which the particle size of the tricalcium orthophosphate is from about 325 mesh to about 500 mesh.

References Cited in the file of this patent

UNITED STATES PATENTS

| | | |
|---|---|---|
| 2,236,844 | Cocke et al. | Apr. 1, 1941 |
| 2,603,567 | Stiles | July 15, 1952 |
| 2,748,001 | Anderson et al. | May 29, 1956 |